United States Patent [19]

Brems et al.

[11] 4,068,957

[45] Jan. 17, 1978

[54] TRANSFER BAR COUPLING

[75] Inventors: John H. Brems, Birmingham; John Kobane, Jr., Livonia, both of Mich.; Wilfred J. Zetner, LaSalle, Canada

[73] Assignee: F. Jos. Lamb Company, Warren, Mich.

[21] Appl. No.: 716,832

[22] Filed: Aug. 23, 1976

[51] Int. Cl.[2] .................... F16D 1/00

[52] U.S. Cl. .................... 403/8; 403/45; 403/19; 403/296; 198/741

[58] Field of Search .................... 403/43–48, 403/343, 296, 118, 19, 21, 7, 8, 23, 184, 293, 286, 288; 198/740, 741, 742; 74/586

[56] References Cited

U.S. PATENT DOCUMENTS

| | | | |
|---|---|---|---|
| 932,744 | 8/1909 | Adams | 403/48 |
| 2,271,159 | 1/1942 | Crawford | 403/8 |
| 2,508,668 | 5/1950 | Gascoigne | 403/293 |
| 3,064,503 | 11/1962 | Fry | 403/19 X |
| 3,473,645 | 10/1969 | Kidd | 198/718 |
| 3,729,219 | 4/1973 | Crane | 403/296 X |

FOREIGN PATENT DOCUMENTS

| | | | |
|---|---|---|---|
| 591,570 | 8/1947 | United Kingdom | 403/296 |
| 1,023,322 | 3/1966 | United Kingdom | 403/293 |
| 1,333,747 | 10/1973 | United Kingdom | 403/296 |

*Primary Examiner*—Andrew V. Kundrat
*Attorney, Agent, or Firm*—Barnes, Kisselle, Raisch & Choate

[57] ABSTRACT

A coupling between adjacent ends of transfer bar sections which includes a screw having threads of opposite hand at opposite ends thereof engaged with threaded counterbores in the ends of the two transfer bar sections. A spacer ground precisely to a desired length is clamped between the ends of the bar sections when the screw is tightened. The spacer and screw have radially aligned holes therein to accommodate a tool for tightening the screw. The holes are dimensioned relative to the tool so that the screw can be tightened a final increment without rotating the spacer.

6 Claims, 9 Drawing Figures

16a 62 78 76 74 78 70 62 46 46 56 72 16b

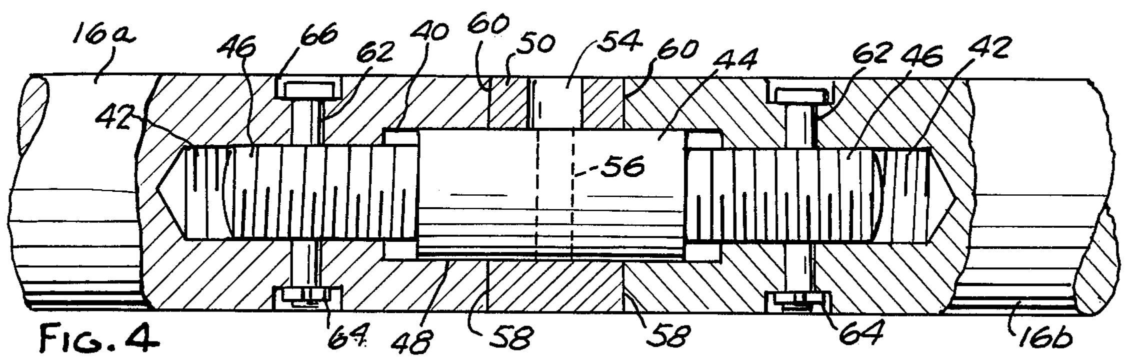
16a
46
66
62
40
60
50
54
60
44
62
46
42
42
56
64
48
58
58
64
16b
FIG. 4
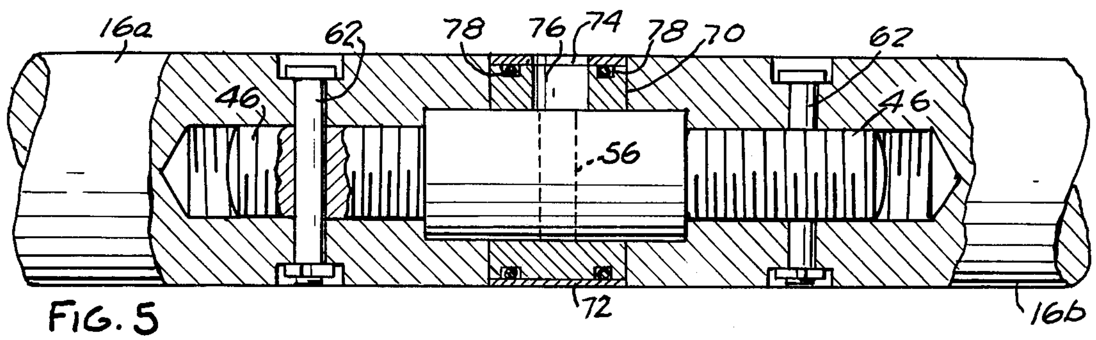
16a
62
78
76
74
78
70
62
46
46
56
72
16b
FIG. 5
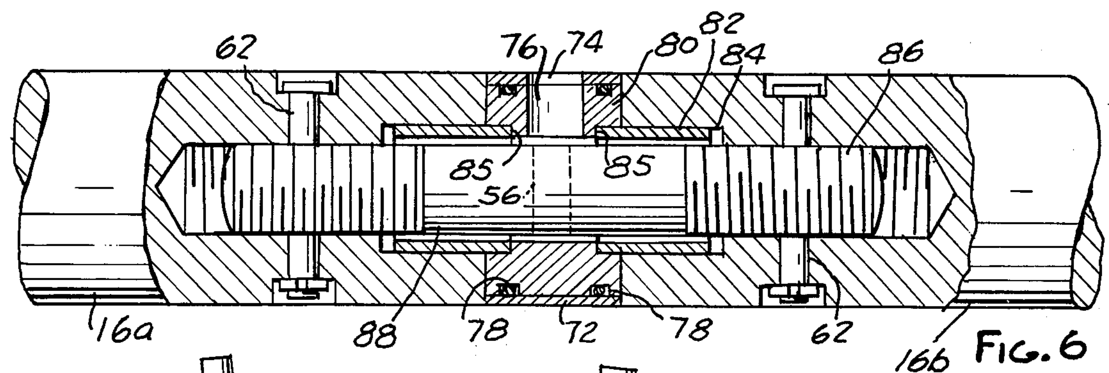
62
76
74
80
82
84
86
85
85
56
16a
88
78
72
78
62
16b
FIG. 6
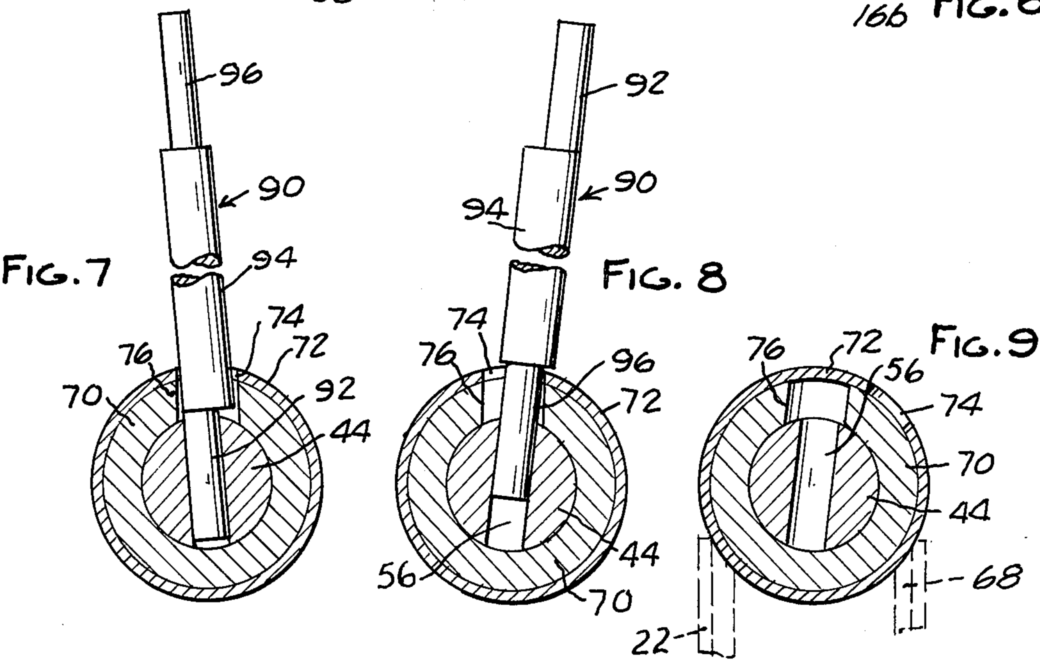
96
90
94
FIG. 7
74
72
76
70
92
44
92
90
94
FIG. 8
74
76
96
72
44
56
70
76
72
FIG. 9
56
74
70
44
68
22

TRANSFER BAR COUPLING

This invention relates to workpiece transfer machines and, more particularly, to an arrangement for adjustably connecting together the adjacent ends of successive sections of the transfer bars used on such machines for advancing workpieces to successive stations.

In transfer machines the transfer bar that extends the length of the machine, engaging the workpieces and simultaneously advancing them to successive stations, is usually segmented into a plurality of longitudinally successive sections. Transfer machines are frequently very long and the making of a transfer bar as a continuous one piece member is not practical from a manufacturing standpoint. During assembly of a transfer machine it is extremely difficult to locate the many successive stations in exact spaced relationship to each other in a direction lengthwise of the machine. While the error in spacing between two successive stations may be small, this error may accumulate over the entire length of the machine to such an extent that the workpiece-engaging members on a continuous one piece transfer bar would have to be individually located at assembly. In view of this problem it is common practice to employ short sections of transfer bars, each with only a few work-engaging members thereon, and couple them together at their adjacent ends with a joint that can be adjusted so that the work-engaging members adjacent each end of a transfer bar section are accurately located with respect to the adjacent stations of the machine. Several different methods of coupling the ends of transfer bars together have been employed, but each possesses one or more shortcomings.

The primary object of this invention is to provide a coupling arrangement for transfer bar sections that is strong, lash-free, easily adjusted and positively permanent.

More specifically, the present invention provides a coupling arrangement in the form of a threaded connection wherein the end faces of adjacent transfer bar sections are tightly compressed and locked against the opposite ends of a spacer positioned therebetween and accurately ground prior to final assembly to a desired length.

In addition, the coupling arrangement of this invention is adapted to be constructed so as to present a minimum of discontinuity in the surface of the transfer bar and to avoid the necessity of machining all of the components thereof to highly precise concentric dimensions.

Other objects, features and advantages of the present invention will become apparent from the following description and accompanying drawings, in which:

FIGS. 4, 5 and 6 show various embodiments of couplings according to the present invention;

FIGS. 7 and 8 illustrate the manner in which a coupling according to the present invention is tightened; and FIG. 9 is a sectional view through a coupling as finally assembled.

Figure 1:
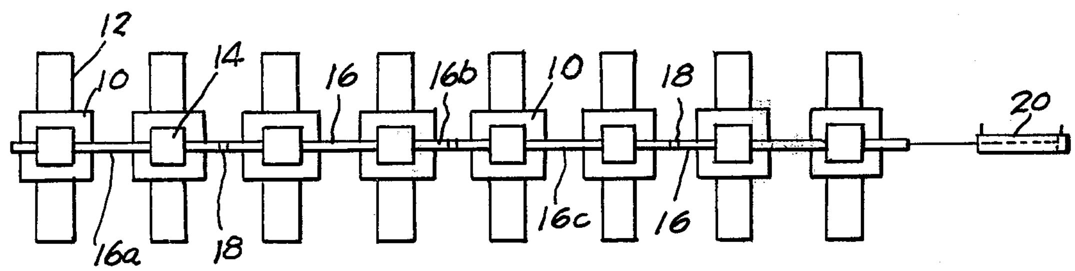
FIG. 1 is a diagrammatic plan view of a typical transfer machine with a segmented transfer bar.

In FIG. 1 a transfer machine is diagrammatically illustrated having equally spaced stations 10 with work-performing machine tools 12 arranged along opposite sides thereof. Work-retaining pallets 14 are shown located at each station and arranged to be transferred simultaneously to the next adjacent station by a transfer bar 16. Transfer bar 16 comprises a plurality of segments or sections *16a, 16b, 16c, 16d* which are connected together at their adjacent ends by a coupling assembly 18. The transfer bar is adapted to be reciprocated by a motor 20.

Figure 2:
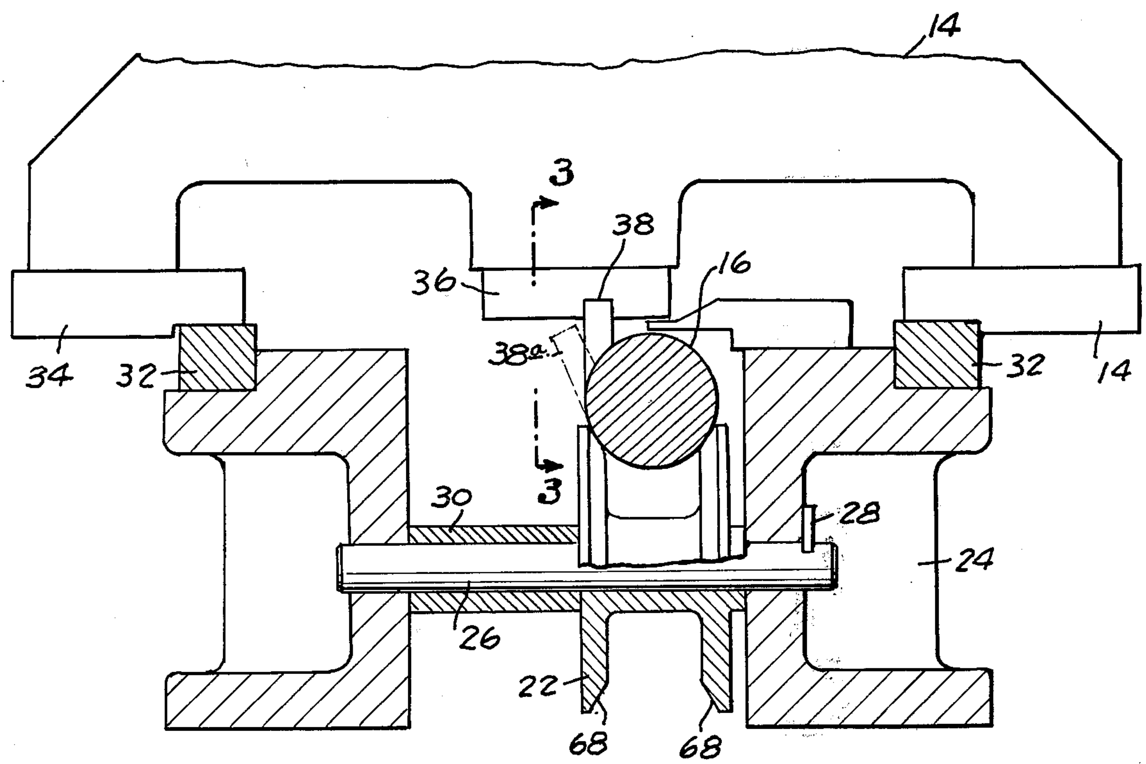
FIG. 2 is a vertical transverse sectional view through a typical station of the transfer machine.
Figure 3:
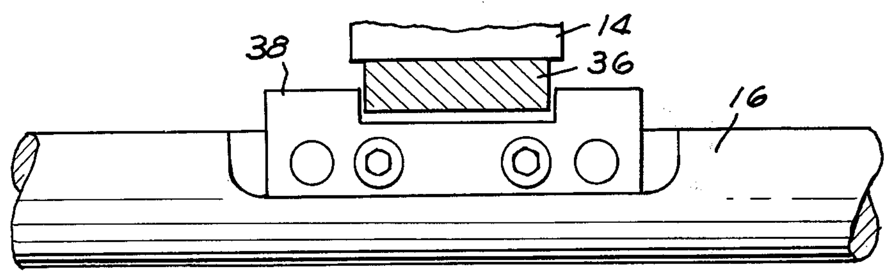
FIG. 3 is a sectional view along the line 3—3 in FIG. 2.

In FIG. 2 a typical station 10 is shown with the transfer bar 16 supported for longitudinal reciprocation on rollers 22. Rollers 22 are supported for rotation on a frame 24 by means of a shaft 26 which is axially and torsionally keyed to the frame by a keeper 28 and a spacer bushing 30. A pair of segmented rails 32 extend lengthwise through the stations 10. Pallets 14 have feet 34 at the corners thereof which ride on rails 32. On the underside of each pallet 14 there is secured a block 36 which is adapted to be engaged by forked work-engaging dogs 38 which are fixed to the transfer bar and spaced thereon at a distance corresponding to the distance between successive stations 10 on the transfer machine. Transfer bar 16 is arranged to be rotated at the opposite ends of its stroke by a mechanism (not shown) to rotate dogs 38 to the broken line position shown in FIG. 2 and designated *38a*. The purpose of this disengagement is to cause the dogs 38 to by-pass blocks 36 and thereby enable retraction of the transfer bar to its starting position after the pallets have been transferred. Thereafter the transfer bar is rotated in the opposite direction to shift dogs 38 to the position shown in full lines in FIG. 2 to again engage blocks 36 for the next transfer cycle. It is apparent that dogs 38 must be spaced along the transfer bar at precise intervals so that the pallets will be accurately positioned at their respective stations.

Referring to FIG. 4, there is illustrated one form of coupling arrangement for connecting the adjacent ends of a pair of transfer bar sections according to the present invention. Transfer bar sections *16a, 16b* have their opposed ends counterbored as at 40 concentric with the longitudinal axes of sections *16a, 16b*. The smaller diameter bore portions 42 of counterbores 40 are threaded, one with a right hand thread and the other with a left hand thread. A screw 44 having threads 46 of opposite hand at its ends engages the threaded bores 42 of sections *16a, 16b*. Screw 44 has a central unthreaded portion 48 having a close sliding fit with the larger diameter portions of bores 40. A tubular spacer 50 has the same outside diameter as transfer bar sections *16a, 16b* and a concentric bore 52 having a close fit with the larger diameter portion 48 of screw 44. Spacer 50 is formed with a radial opening 54 and the larger diameter portion 48 of screw 44 is formed with an opening 56 therethrough which registers axially with opening 54, but of smaller diameter. With the above described arrangement the two transfer bar sections and spacer 50 are axially aligned and provide a stepless outer surface on the transfer bar which rides smoothly over the support roller 22.

The coupling is initially assembled in the manner illustrated in FIG. 4 by rotating screw 44 and spacer 50 by means of a tool inserted through openings 54,56. As the tool is rotated in one direction the end faces 58 of the two transfer bar sections are tightened into abutting engagement with the opposite ends of spacer 50. After this pre-assembly has been completed the spacing between the dogs on sections **16*a*,16*b* is measured and compared to the spacing of the stations. A corrective dimension for the dog spacing is thus determined. The coupling is then disassembled by rotating screw 44 and spacer 50 so as to remove screw 44. Thereafter, either, or preferably both, ends 60 of the spacer 50** is ground an amount to effect the corrective dimension and the coupling is then re-assembled. When so re-assembled the spacing between the dogs on the two transfer bar sections will correspond with the spacing between the stations.

After screw 44 has been tightened to the desired extent, transverse holes are drilled through the bar sections and the threaded portions 46 of the screw and headed dowels 62 are pressed therethrough and secured in place by snap rings 64. Dowels 62 are preferably located in the same radial plane and are arranged so that the counterbores 66 at the outer surface of the two transfer bar sections will not be in the path of travel of the contacting angled faces 68 of rollers 22. It is apparent that the final location of opening 54 in spacer 50 cannot be predetermined because it is dictated by the final annular location of opening 56 in screw 44. If opening 54 lies in the path of the angled contact face 68 of roller 22, a roller wherein the face 68 is shaped to conform to the radius of the transfer bar can be used.

A roller with the profile of the outer surface of the transfer bar cannot always be employed. To overcome this problem the arrangement shown in FIG. 5 may be adopted where necessary. In this arrangement spacer 70 has an outer diameter less than the diameter of transfer bar sections **16*a*,16*b*. A tubular shield 72 is telescoped over spacer 70. The outer cylindrical surface of shield 72 is flush with the outer surface of the transfer bar sections. Shield 72 has a radial opening 74 therein which corresponds in size with the radial opening 76 in spacer 70. The length of shield 72 is slightly less than the length of spacer 70 so that when the spacer is axially loaded by tightening the bar sections 16*a*,16*b* the shield is free to rotate. Shield 72 can be ground to the exact desired length after the amount to be ground from the ends of spacer 70 has been determined. A pair of resilient O-rings 78 are arranged between shield 72 and spacer 70. These O-rings prevent the shield from turning freely on spacer 70 and at the same time seal the coupling against the ingress of dirt and chips when the shield is manually rotated to a position wherein the opening 74 therein is out of registry with the opening 76 in spacer 70**.

If it is desired to avoid criticality of some of the dimensions of the coupling assembly with respect to concentricity, the arrangement shown in FIG. 6 may be employed. In this arrangement spacer 80 is piloted on bushings 82 which are disposed in concentric counterbores 84. This arrangement provides the desired concentricity without requiring a close fit between the screw 86 and the spacer. It will be noted that the intermediate portion 88 of the screw is such that it is spaced from the inner periphery of bushings 82. If spacer 80 is provided with annular shoulders 85, then the length of bushings 82 is such that the bushings will not be compressed between the shoulders 85 and the ends of bores 84 when the screw is tightened. It will be apparent that, if desired, the function of bushings 82 can be performed by an extended reduced pilot diameter on the end of each of the transfer bar sections machined so as to provide a pair of annular shoulders on which the spacer is piloted.

The manner in which the coupling shown in FIGS. 4, 5 and 6 can be tightened in final assembly is illustrated in FIGS. 7 and 8. When the joint is finally assembled the screw should be tightened until the threads reach their highest allowable tensile stress in order to obtain the ultimate utility of the coupling. Tightening of the screw to this extent results in the spacer being tightly compressed between the ends of the two transfer bar sections and assures that the joint will remain lash-free for the life of the machine. Accordingly, to obtain this condition of ultimate utility it is essential that the screw is capable of being turned its final increment independently of the rotation of the spacer. Stated differently, it is desirable to rotate the screw its final increment while the spacer remains fixed, in a rotational sense, relative to the two transfer bar sections. In the disclosed arrangement this is accomplished by inserting a bar-shaped tool 90 in the registering openings in the screw and spacer (and also the shield 72, if the latter is used) so as to rotate the entire coupling assembly to tightly pinch the spacer between the ends of the two transfer bar sections. However, at this point further rotation of the entire coupling assembly is impossible even though the screw may not have reached the desirable stress. This problem is solved by having one end 92 of the tool eccentric relative to the handle portion 94. The reduced diameter end 92 is inserted into the opening 56 of the screw and the spacer (as well as the seal, if it is used) is displaced to accommodate the larger diameter portion 94 of the tool. Assuming a clockwise rotation of the tool as viewed in FIGS. 7 and 8 is required for tightening, the tool is rotated about its longitudinal axes so as to displace the opening in the spacer clockwise relative to the direction of the opening in the screw. This is illustrated in FIG. 7. The handle is then torqued to tightly clamp the spacer between the ends of the two transfer bar sections. Thereafter the tool is removed and the opposite reduced end portion 96 concentric to handle 94 is inserted through the openings in the screw and spacer. However, the openings are sufficiently out of registry to prevent the larger diameter portion 94 from being inserted into the opening in the spacer. The smaller diameter portion 96 has sufficient clearance to enable further torquing of the screw to the desired stress without the resistance of the friction between the ends of the spacer and the ends of the two transfer bar sections. Thus, the screw can be rotated relative to the spacer from the position shown in FIG. 7 to the position shown in FIG. 8. It is clear, however, that this final tightening of the screw can be accomplished by extracting the tool slightly and allowing the larger diameter handle portion 94 to clear the hole in the spacer.

Before the holes are drilled and reamed for the dowels, shield 72 in the arrangement shown in FIGS. 5 and 6 is rotated so that hole 74 therein is out of registry with the hole 76 in the spacer and also rotated out of the path of the angled faces 68 to support rollers 22 as illustrated in FIG. 9. Thus, with the arrangement shown in FIGS. 5 and 6 the roller 22 has a smooth joint to roll over and at the same time the joint is sealed against chips and dirt.

We claim:

1. In a machine for transferring workpieces progressively through a series of stations, a cylindrical transfer bar comprising a plurality of linearly successive sections coupled together at their adjacent ends, the adjacent end faces of said sections being in abutting relation with the opposite end faces of a tubular spacer positioned therebetween, the adjacent end portions of each of said sections having a threaded bore therein concentric with the longitudinal axes of said sections, the threads of said bores being of opposite hand, a double-ended screw in threaded engagement with said threaded bores so that when the screw is rotated in opposite directions the transfer bar sections are displaced axially toward and away from each other, said spacer and screw having radially registering openings therein for the reception of a tool for turning said screw to compress the spacer between the ends of adjacent transfer bar sections, said holes being shaped to permit final tightening of the screw while the spacer remains fixedly clamped between the ends of the transfer bar sections, means for locking said screw and transfer bar sections against relative rotation for retaining said spacer in said compressed condition, the outer diameter of said spacer being less than the outer diameter of the transfer bar sections and including a tubular shield circumferentially circumscribing the spacer, said shield having a radial opening therein adapted to register with the radial opening in said spacer, said shield having a length smaller than the spacer to permit rotation of the shield relative to the spacer to locate the opening therein in a preselected circumferential position, said shield having an outer diameter corresponding to the outer diameter of the transfer bar sections.

2. The combination set forth in claim 1 including means for retaining the shield in its adjusted rotative position.

3. The combination set forth in claim 2 wherein said retention means comprises a pair of annular seals disposed between the inner surface of the shield and the outer surface of the spacer and on axially opposite sides of the opening therein.

4. In a machine for transferring workpieces progressively through a series of stations, a cylindrical transfer bar comprising a plurality of linearly successive sections coupled together at their adjacent ends, the adjacent end faces of said sections being in abutting relation with the opposite end faces of a tubular spacer positioned therebetween, the adjacent end portions of each of said sections having a threaded bore therein concentric with the longitudinal axes of said sections, the threads of said bores being of opposite hand, a double-ended screw in threaded engagement with said threaded bores so that when the screw is rotated in opposite directions the transfer bar sections are displaced axially toward and away from each other, said spacer and screw having radially registering openings therein for the reception of a tool for turning said screw to compress the spacer between the ends of adjacent transfer bar sections, said holes being shaped to permit final tightening of the screw while the spacer remains fixedly clamped between the ends of the transfer bar sections, means for locking said screw and transfer bar sections against relative rotation for retaining said spacer in said compressed condition, the ends of said transfer bar sections being counterbored, the smaller diameter bore portion comprising said threaded bores, the portion of the screw intermediate its ends extending through and being of smaller diameter than the larger bore portions of said counterbores, means on the ends of said transfer bar sections forming axially extending annular shoulders which are accurately concentric with the axes of the transfer bar sections, said spacer having an inner diameter larger than the intermediate portion of said screw and being piloted at its opposite ends on said shoulders.

5. The combination set forth in claim 4 wherein the shoulders extend axially beyond said end faces of the transfer bar sections.

6. The combination set forth in claim 5 wherein the larger bore portions of said counterbores are accurately concentric with the axes of the transfer bar sections and said shoulders comprises sleeves seated in said larger bore portions and extending axially beyond said end faces of the transfer bar sections, said sleeves having an inner diameter larger than said intermediate portion of said screw.

* * * * *